US012715737B2

(12) United States Patent
Hawkins et al.

(10) Patent No.: US 12,715,737 B2
(45) Date of Patent: Aug. 25, 2026

(54) SLIDING GUIDE SHOE AND ELEVATOR

(71) Applicant: Kone Corporation, Helsinki (FI)

(72) Inventors: Giovanni Hawkins, Helsinki (FI); Sami Janhunen, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/950,672

(22) Filed: Nov. 18, 2024

(65) Prior Publication Data

US 2025/0074746 A1 Mar. 6, 2025

Related U.S. Application Data

(63) Continuation of application No. PCT/EP2022/066508, filed on Jun. 16, 2022.

(51) Int. Cl.
*B66B 7/04* (2006.01)

(52) U.S. Cl.
CPC .............. *B66B 7/047* (2013.01); *B66B 7/048* (2013.01)

(58) Field of Classification Search
CPC .......... B66B 7/046; B66B 7/047; B66B 7/048
See application file for complete search history.

(56) References Cited

U.S. PATENT DOCUMENTS 2,226,770 A * 12/1940 Holter ...................... B66B 7/04 384/39
4,598,798 A 7/1986 Koppensteiner
4,652,146 A * 3/1987 Ellermann .............. B66B 7/047 384/39
8,657,076 B2 * 2/2014 Beaudry ................. B66B 7/048 187/409
2010/0065382 A1 3/2010 Beaudry
2015/0239710 A1 * 8/2015 Det ......................... B66B 7/047 187/409

FOREIGN PATENT DOCUMENTS

| | | | | | |
|---|---|---|---|---|---|
| CN | 1263861 A | * | 8/2000 | ............. | B66B 7/047 |
| CN | 102741147 B | * | 11/2014 | ............. | B66B 7/047 |
| CN | 108328457 A | * | 7/2018 | ........... | B66B 7/1292 |
| CN | 109665408 A | * | 4/2019 | ............. | B66B 7/047 |
| CN | 112919282 A | * | 6/2021 | ............. | B66B 7/024 |
| CN | 112919285 A | * | 6/2021 | ............. | B66B 7/027 |
| DE | 202010000849 U1 | | 5/2011 | | |
| FI | 80434 B | * | 2/1990 | ............... | B66B 7/02 |

OTHER PUBLICATIONS

International Search Report for International Application No. PCT/EP2022/066508 dated Feb. 13, 2023.
Written Opinion of the International Searching Authority for International Application No. PCT/EP2022/066508 dated Feb. 13, 2023.

* cited by examiner

*Primary Examiner* — Minh Truong
(74) *Attorney, Agent, or Firm* — Harness, Dickey & Pierce, P.L.C.

(57) ABSTRACT

A sliding guide shoe for guiding a moving component in an elevator shaft includes a supporting surface, and a sliding part disposed to be supported by the supporting surface. The supporting surface and the sliding part have contact through contact points where the supporting surface of the frame part is in contact with the outer surface of the sliding part. The contact points constitute a minor fraction of the corresponding surface of the outer surface of the sliding part and provide for at least one of the supporting surface and the sliding part the capability to bend for absorbing guide rail imperfections.

17 Claims, 6 Drawing Sheets

SLIDING GUIDE SHOE AND ELEVATOR

CROSS-REFERENCE TO RELATED APPLICATION

This application is a continuation of PCT International Application No. PCT/EP2022/066508 which has an International filing date of Jun. 16, 2022, the entire contents of which are incorporated herein by reference.

BACKGROUND

The invention relates to a sliding guide shoe for guiding a moving component in an elevator shaft.

The invention further relates to an elevator.

Normally elevators comprise essentially vertical guide rails disposed in an elevator shaft. The guide rails are guiding an elevator car or a counterweight arranged to travel up and down in the elevator shaft. Guide shoes are arranged to the elevator car and the counterweight, which guide shoes are arranged to guide the passage of the elevator car and the counterweight on the respective guide rail. One commonly used type of guide shoes is a sliding guide shoe.

The guide rails are assembled in the elevator shaft from guide rail elements of a certain length, which elements are connected in the installation phase end-on-end one after the other. Guide rails of essentially the height of the elevator shaft, are in practice, impossible to install in a fully straight line, owing to which lateral forces from the guide rails are exerted on the sliding guide shoes when the elevator car or the counterweight moves. These forces cause vibrations and noise. If there is no sort of damping or insulation between a sliding guide shoe and the elevator car or the counterweight, vibrations and noises are transmitted to the elevator car, which disturbs the passengers.

The problem with known sliding guide shoes is that they have a complicated and thus expensive structure.

BRIEF DESCRIPTION

Viewed from a first aspect, there can be provided a sliding guide shoe for guiding a moving component in an elevator shaft essentially vertically by at least one guide rail, said sliding guide shoe comprising

- a frame part, comprising a supporting surface,
- a sliding part disposed to be supported by the supporting surface, the sliding part comprising
- an inner surface functioning as a sliding surface against the guide rail, and
- an outer surface arranged against the supporting surface, wherein
- the supporting surface and the sliding part have contact through contact points where the supporting surface of the frame part is in contact with the outer surface of the sliding part,
- said contact points are constituting a minor fraction of the corresponding surface of said outer surface,
- the contact points providing for at least one of the supporting surface and the sliding part capability to bend for absorbing guide rail imperfections.

Thereby a sliding guide shoe having very simple and affordable structure and being also easy and quick to install may be achieved.

Viewed from a further aspect, there can be provided an elevator comprising the sliding guide shoe as defined in this disclosure.

Thereby an elevator having very simple and affordable structure while having high passenger comfort may be achieved.

The sliding guide shoe and the elevator are characterised by what is stated in the independent claims. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

In an embodiment, the sliding part is configured to function as a sliding surface that rests directly against the guide rail.

An advantage is that a very simple and cost-effective structure of the sliding guide shoe may be achieved.

In an embodiment, the inner surface of the sliding part is made of polymer or polymer composite material.

An advantage is that a lubrication-free sliding structure needing may be achieved.

In an embodiment, the inner surface of the sliding part is made of injection molded polyethylene (PE), high-density-polyethylene (HDPE) or ultra-high molecular weight polyethylene (UHMWPE).

An advantage is that a sliding part that is affordable, resistant to most chemicals and has high durability may be achieved.

In an embodiment, at least one of the contact points is arranged to the frame part.

An advantage is that the structure of the sliding part may be kept simple and affordable.

In an embodiment, at least one of the contact points comprises a tab being dimensioned to elastically bend under loads caused by guide rail imperfections.

An advantage is that the structure is simple, and its stiffness easily defined by selecting dimensions thereof.

In an embodiment, at least one of the contact points is arranged to side walls of the supporting surface.

An advantage is that guide rail imperfections causing forces towards the side walls may be effectively absorbed.

In an embodiment, at least one of the contact points is arranged to back wall of the supporting surface.

An advantage is that guide rail imperfections causing forces towards the back wall may be effectively absorbed.

In an embodiment, at least one of the side walls and the back wall comprises two or more contact points.

An advantage is that guide rail imperfections may be absorbed even more effectively.

In an embodiment, the contact point in form of the tab is formed of the same material as and integrated with the supporting surface.

An advantage is that a sliding guide shoe having very simple structure may be achieved.

In an embodiment, at least one of the contact points comprises a bulge of the supporting surface extending towards the outer surface of the sliding part.

An advantage is that a very simple and affordable structure may be achieved.

In an embodiment, the frame part is arranged to constitute a trough-shaped space for receiving the sliding part therein.

An advantage is that a sturdy sliding guide shoe structure that copes easily with forces caused by guide rail imperfections and transmitted by the sliding part that receiving may be achieved.

In an embodiment, the frame part is arranged to constitute a skeleton-structure where empty spaces alternate with ribs, and wherein the supporting surface is arranged in said ribs.

An advantage is that the frame part as such may serve as force absorbing structure.

In an embodiment, the sliding guide shoe is arranged in an elevator car.

An advantage is that vibrations and noise caused by elevator guide rail imperfections may be absorbed and dampened.

In an embodiment, the sliding guide shoe is arranged in a counterweight.

An advantage is that vibrations and noise caused by counterweight guide rail imperfections may be absorbed and dampened.

BRIEF DESCRIPTION OF FIGURES

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION

Figure 1:
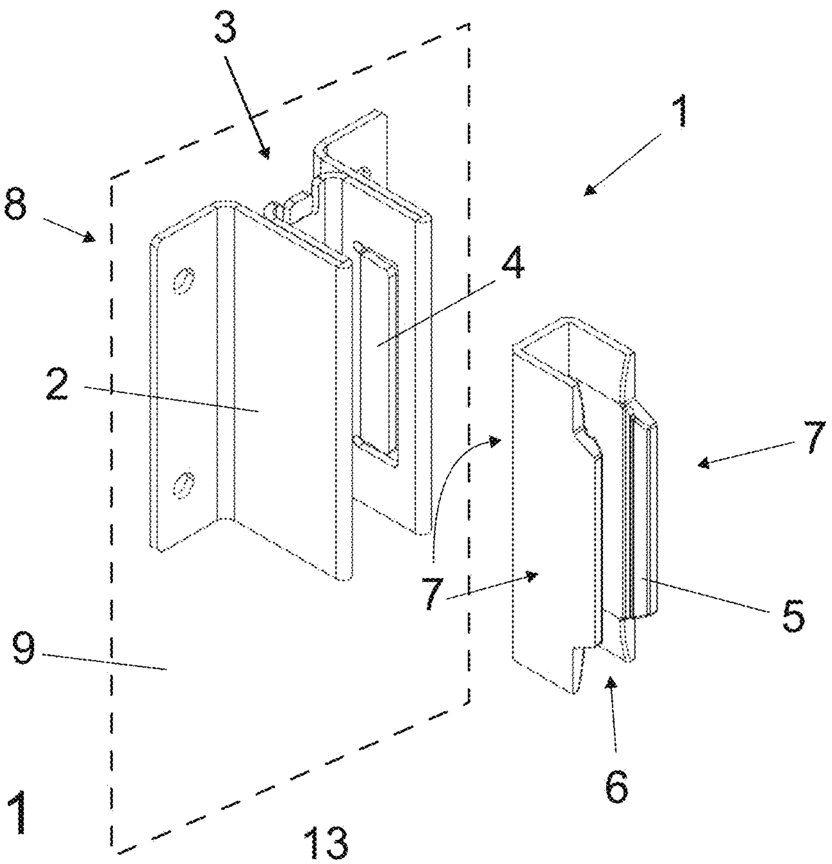
FIG. 1 is a schematic exploded view of a sliding guide shoe.
Figure 2:
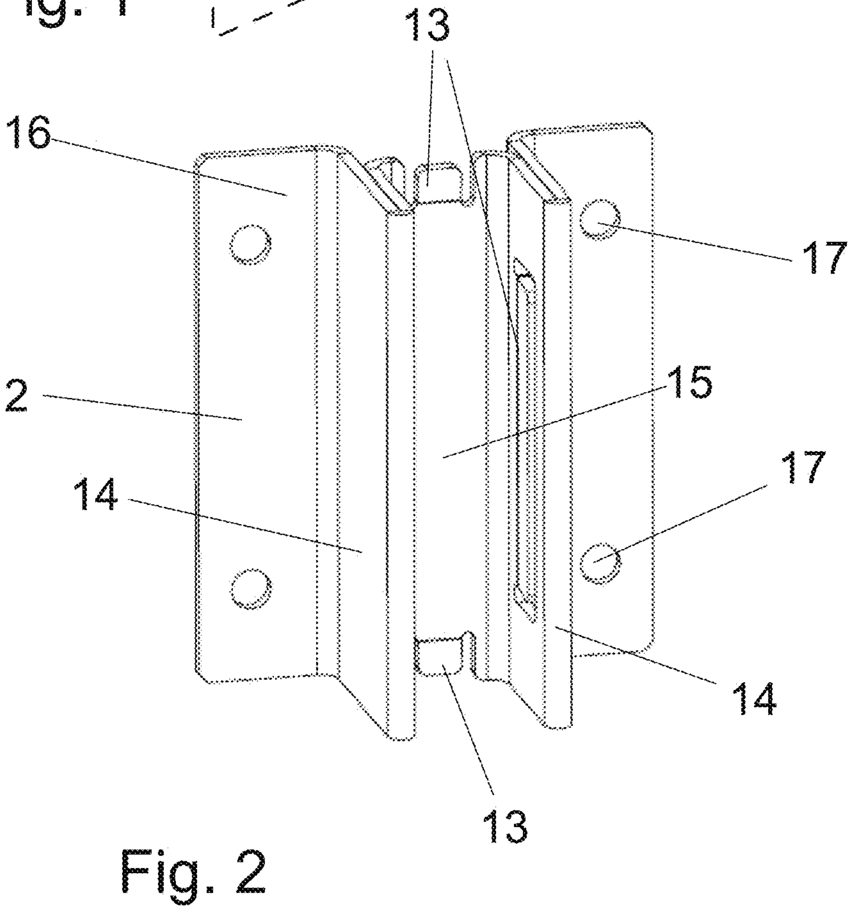
FIG. 2 is a schematic view of the frame part of the sliding guide shoe shown in FIG. 1.

FIG. 1 is a schematic exploded view of a sliding guide shoe, and FIG. 2 is a schematic view of the frame part of the sliding guide shoe shown in FIG. 1.

According to an aspect of the invention, the sliding guide shoe 1 comprises a frame part 2 that has a supporting surface 3, and a sliding part 5 that is disposed to be supported by the supporting surface 3.

In an embodiment, the frame part 2 is bent from a metal plate into such a shape that the rear edges of the frame part have lugs 16 extending outwards to the sides thereof. A fixing arrangement 8 is arranged in said lugs 2. In an embodiment, the fixing arrangement 8 comprises fixing holes 17 through which fixing means, such as screws or bolts may be arranged for attaching the sliding guide shoe 1 to its mounting base 9, such as to an elevator car or to the car sling.

Between the lugs 16 is a trough-shaped space formed by side walls 14 and a back wall 15. Inner surfaces of the side walls 14 and a back wall 15 create the supporting surface 3 that is arranged for supporting the sliding part 5.

In an embodiment, such as shown in FIGS. 1 and 2, the side walls 14 are arranged at least essentially in right angles in relation to the lugs 16 and the back wall 15.

It is to be noted that there are many ways to manufacture the frame part 2. It can also be manufactured, for instance, by casting or welding from multiple parts, etc.

The sliding part 5 is dimensioned do that it can be fit in the trough-shaped space of the support part 2. The sliding part 5 comprises side walls and a rear wall between the side walls so that a trough-shaped space is formed. In an embodiment, the sliding part 5 is fitted into its position in the trough-shaped space of the support part 2 by means of precompression or shape-locking.

The inner surface 6 of the sliding part functions as sliding surface that slides on the guide rail. The sliding surface rests directly against the guide rail (not shown).

The outer surface 7 of the sliding part is arranged towards the supporting surface 3.

In an embodiment, the sliding part 5, or at least the inner surface 6 thereof, is manufactured from a material that has low friction coefficient. In an embodiment, said material is plastic or plastic composite. In an embodiment, said plastic or plastic composite comprises polyolefin material, such as polyethylene (PE), for instance high-density-polyethylene (HDPE) or ultra-high molecular weight polyethylene (UHMWPE).

In an embodiment, the sliding part 5 has a monolithic structure. Thus, the whole sliding part 5 may be manufactured from e.g. plastic or plastic composite for instance from polyolefin material, such as polyethylene (PE), for instance high-density-polyethylene (HDPE) or ultra-high molecular weight polyethylene (UHMWPE).

Between the frame part 2 and the sliding part 5 there are arranged contact points 4 where the supporting surface 3 of the frame part is in contact with the outer surface 7 of the sliding part. The contact points 4 constitute or make only a minor fraction of the corresponding surface of the outer surface 7 of the sliding part. If there is no force caused by guide rail imperfections acting on the sliding part 5, the frame part 2 is in contact with the sliding part 5 only through the contact points 4. In other words, outside the contact points 4 there is no contact between the supporting surface 3 of the frame part and the outer surface 7 of the sliding part. In an embodiment, such as shown in FIGS. 1 and 2, outside the contact points 4 there is a gap or play between the supporting surface and the outer surface.

The contact points 4 provide the supporting surface 3 or the sliding part 5 or both the supporting surface 3 and the sliding part 5 capability to bend for absorbing guide rail imperfections. In case the guide rail imperfections create forces high enough, the sliding part 5 or the contact points 4 may temporarily bend or otherwise deform in such an extent that it contacts with the supporting surface 3 outside the contacting points.

The term "minor fraction" means that the contact points 4 create a contact area between the supporting surface 3 and the outer surface 7 of the sliding part corresponding an area that is less than 50% of the area of said outer surface. The outer surface 7 of the sliding part is sum of areas of side walls and a back wall of said sliding part.

In an embodiment, the contact points 4 create point-sized contacts between the supporting surface 3 and the outer surface 7, thus the contact area may be as low as approximately 5% of the area of said outer surface, or even less. In an embodiment, such as shown in FIGS. 3, 4 and 7-12 comprising a skeleton-like structure, the "minor fraction" may be 8%-20% of the outer surface 7 of the sliding part.

In an embodiment, at least one of the contact points 4 is arranged to the frame part 2. In an embodiment, such as shown in FIGS. 1 and 2, all the contact points 4 are arranged to the frame part 2.

In an embodiment, the contact point 4 comprises a tab 13. The tab 13 is dimensioned to elastically bend under loads caused by guide rail imperfections. In an embodiment, such as shown in FIGS. 1 and 2, the tab 13 is formed of the same material as the supporting surface 3. In the embodiment shown in FIGS. 1 and 2, the tab 13 is a part of the metal plate from which the frame part 2 is bent. The tab 13 is partly cut away from the plate that creates the supporting surface 3 and bent towards the trough-shaped space that receives the sliding part 5.

In an embodiment, there are contact points 4 arranged to side walls 14 of the supporting surface. In an embodiment, there are contact points 4 arranged to back wall 15 of the supporting surface. In an embodiment, such as shown in FIGS. 1 and 2, there are contact points 4 in the side walls 14 as well as in the back wall 15. The number of the contact points 4 arranged in the side wall and the back wall may vary. In the embodiment shown in FIGS. 1 and 2, there are one contact point in both of the side walls and two in the back wall.

According to an aspect, the ability of the sliding guide shoe 1 for absorbing and dampening vibrations and noise caused by guide rail imperfections is based on elastic bending of the contact points 4 or the sliding part 5 or both under forces caused by said guide rail imperfections. Where said bending is taking place depends at least mainly on dimensions and material characteristics of the contact points and the sliding part.

Figure 3:
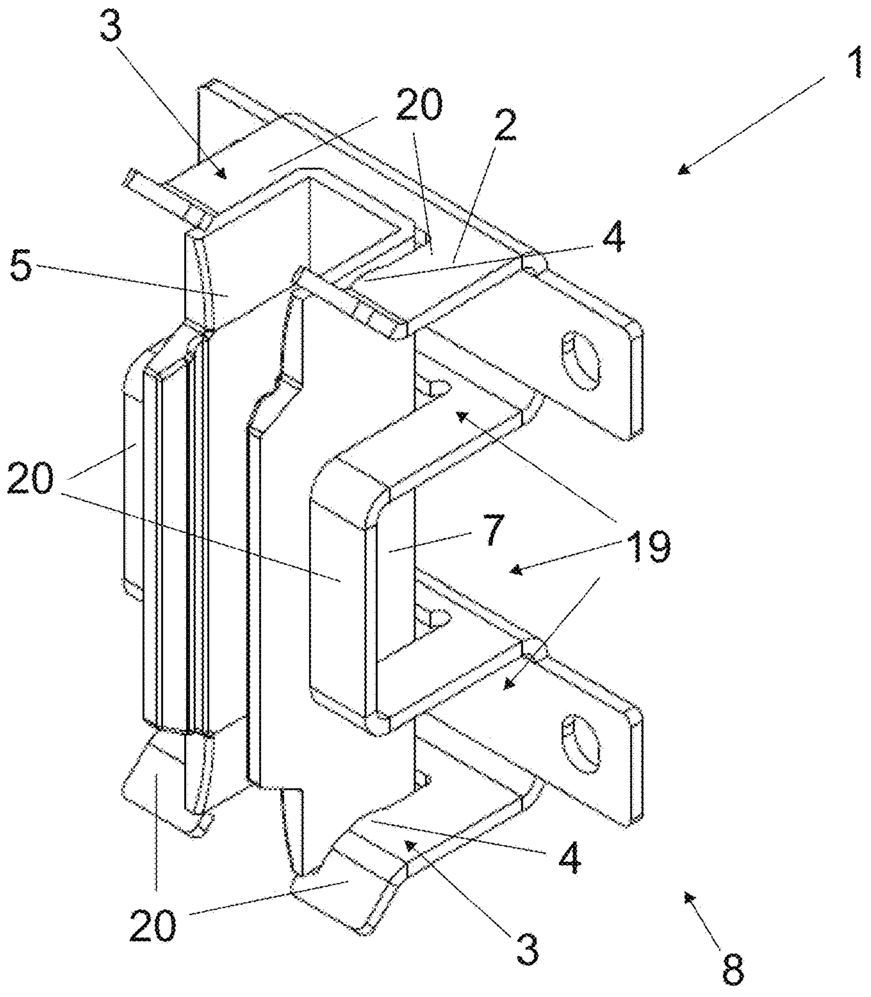
FIG. 3 is a schematic view of another sliding guide shoe.
Figure 4:
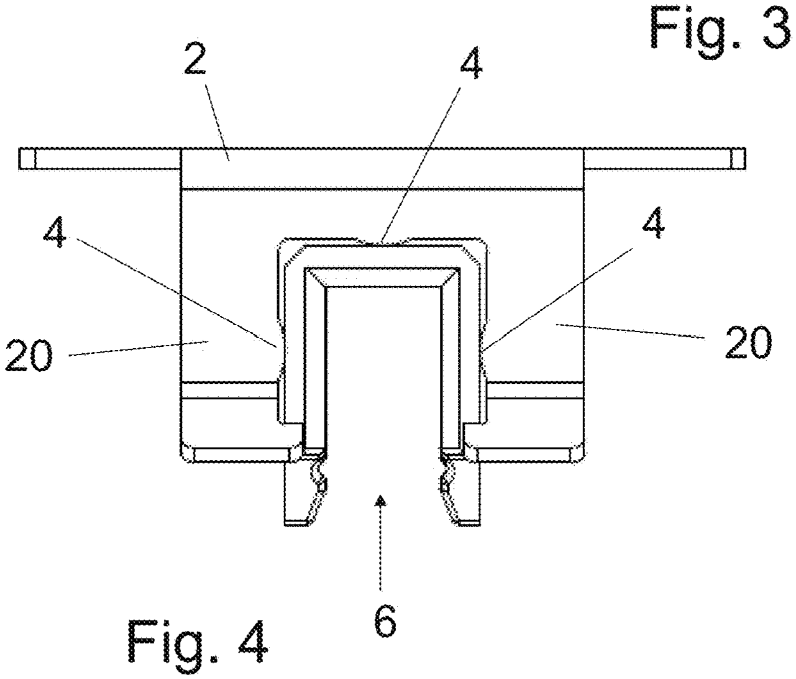
FIG. 4 is a schematic top view of the sliding guide shoe shown in FIG. 3.

FIG. 3 is a schematic view of another sliding guide shoe, and FIG. 4 is a schematic top view of the sliding guide shoe shown in FIG. 3. In an embodiment, the frame part 2 is constructed at least partly of ribs 20 that create a space for receiving and supporting a sliding part 5. The ribs constitute a skeleton-structure where empty spaces 19 alternate with the ribs 20. The supporting surface 3 is arranged in said ribs.

In an embodiment, such as shown in FIGS. 3 and 4, projection-like contact points 4 are arranged to the ribs 20. These contact points 4 may assist the sliding part 5 to bend in relation to the ribs. In another embodiment, at least some, or even all, of the ribs 20 is/are devoid of projection-like contact points. Then the rib(s) 20 as such constitute(s) the contact points 4 against the sliding part 5. Where the bending for absorbing and dampening vibrations and noise is taking place depends at least mainly on dimensions and material characteristics of the ribs and the sliding part.

Figure 5:
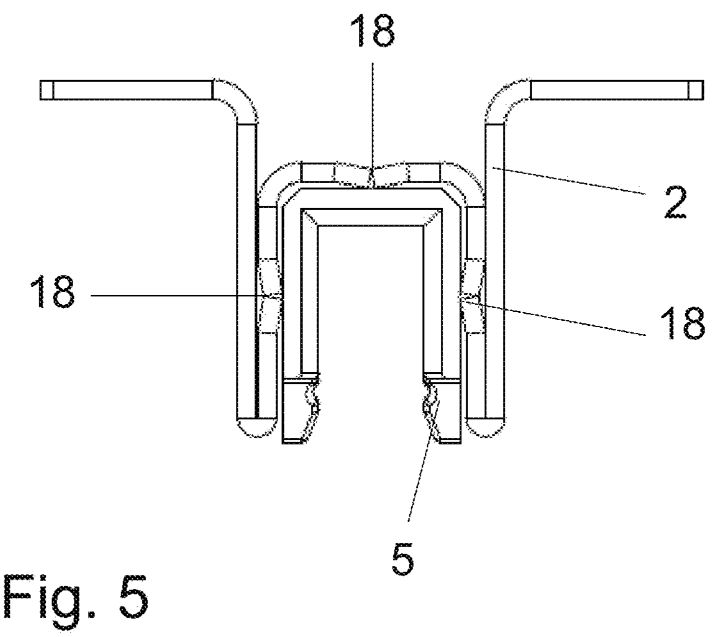
FIG. 5 is a schematic side top view of a third sliding guide shoe.

FIG. 5 is a schematic side top view of a third sliding guide shoe. In an embodiment, the contact point 4 comprises a bulge 18 provided in the supporting surface 3 so that the bulge extends towards the outer surface 7 or, in other words, towards the space reserved for the sliding part 5.

In an embodiment, such as shown in FIG. 5, there is one bulge in each of the side walls 14 and the back wall 15. However, the number of the bulges may vary, and some of the walls 14, 15 may be provided without any bulges.

In an embodiment, such as shown in FIG. 5, the bulge 18 has an elongated or ridge-like shape arranged in the direction of movement of the moving component (not shown), such as an elevator car or a counterweight. The length of the bulge 18 may be equal or at least substantially equal with the length of the respective supporting surface 3, but also substantially shorter bulge may be present. In another embodiment, the bulge 18 has a boss-like or point-formed structure.

It is to be noted here that the sliding guide shoe 1 typically comprises plurality of contact points 4. In an embodiment, all the contact points 4 are of same type, such as the tabs or the bulges described in this disclosure, but this is not necessary. For instance, in some embodiments the contact point(s) arranged in the back wall differ(s) from the contact points arranged in the side walls.

In an embodiment, the contact points 4, or at least some of them, are provided in the sliding part 5, on its outer surface 7. The structure, shape and characteristics of the contact points on said outer surface may be similar with those provided in the frame part 2 and described in this disclosure.

Figure 6:
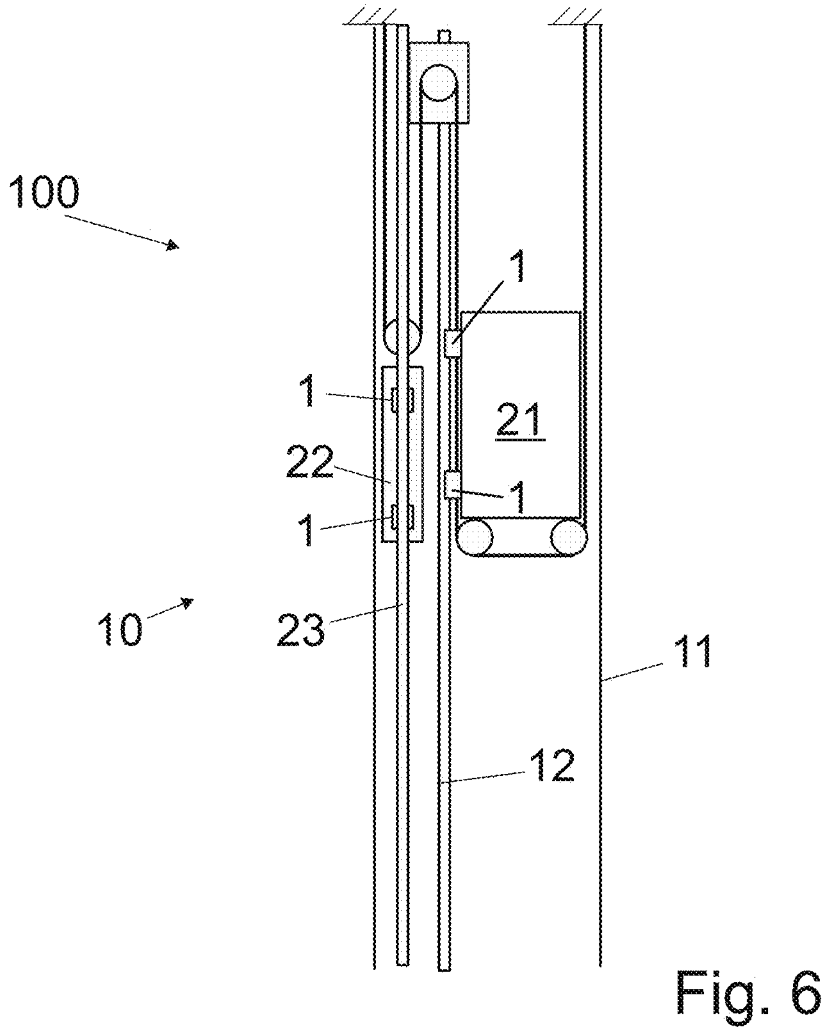
FIG. 6 is a schematic side view of an elevator.

FIG. 6 is a schematic side view of an elevator. As already disclosed, the moving component 10 where the sliding guide shoe 1 is attached may be an elevator car 21. Then the sliding guide shoe 1 is arranged to slide against an elevator car guide rail 12. The number of the sliding guide shoes 1 attached to the elevator car may vary. In the embodiment shown in FIG. 6 there are two sliding guide shoes in the elevator car 21, but in another embodiment, there may be only one sliding guide shoe in the elevator car, and in still another embodiment the number of the sliding guide shoes may be three or even more.

The embodiment shown in FIG. 6 comprises just one elevator car guide rail 12, but embodiments having two or even more elevator car guide rails are also possible. In these embodiments, the elevator car 21 is preferably supported by the sliding guide shoes 1 against every one of the elevator car guide rails.

In an embodiment, the moving component 10 is a counterweight 22. Also the counterweight 22 may comprise one, two or even more sliding guide shoes 1 arranged to slide against a counterweight guide rail 23. Embodiments having two or even more counterweight guide rails are possible, and one or more sliding guide shoes may be arranged against every one of said guide rails.

In an embodiment, both the elevator car 21 and the counterweight 22 of the elevator are provided with sliding guide shoes 1.

In an embodiment, the elevator 100 is an elevator arranged to a finished building for serving passenger transportation and/or goods transportation in the finished building.

In an embodiment, the elevator 100 is a construction time use (CTU) elevator used for transporting passengers and/or materials in and out of a building during its construction.

Figure 7:
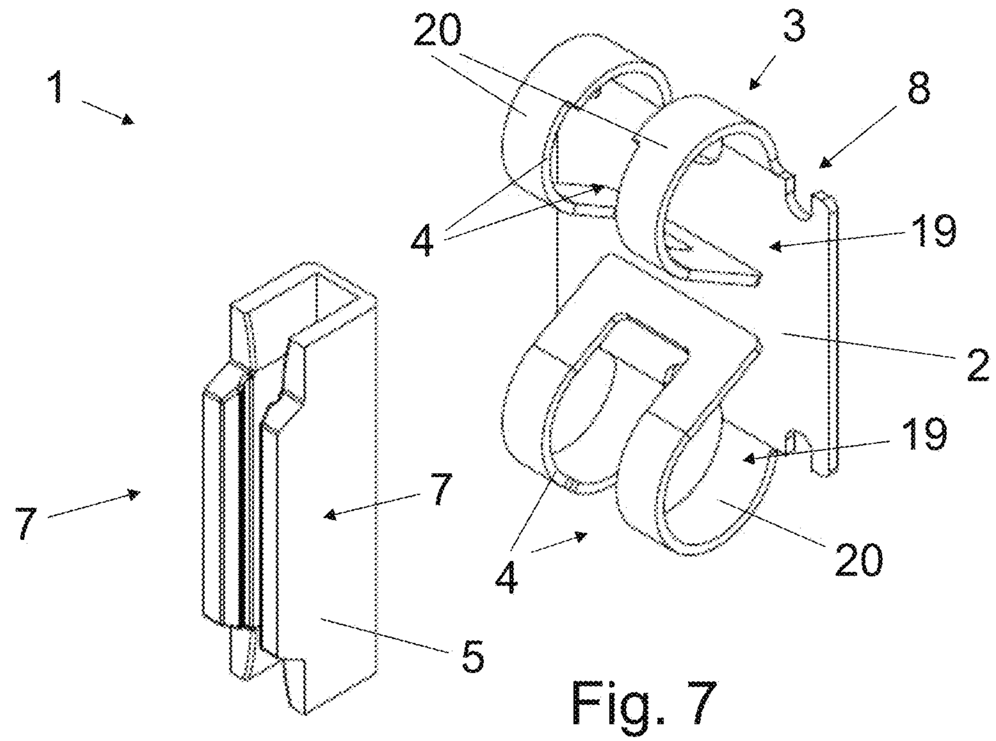
FIG. 7 is a schematic view of a fourth sliding guide shoe.
Figure 8:
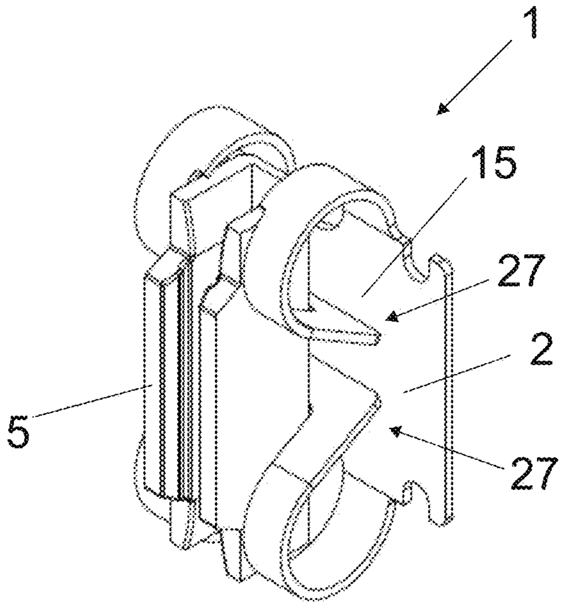
FIG. 8 is another schematic view of the sliding guide shoe shown in FIG. 7.

FIG. 7 is a schematic view of a fourth sliding guide shoe, and FIG. 8 is another schematic view of the sliding guide shoe shown in FIG. 7. This embodiment has many features similar to the embodiment shown in FIGS. 3 and 4. However, the skeleton-structure constructed from ribs 20 and empty spaces 19 has a shape that differs from the embodiment shown in FIGS. 3 and 4. As shown, the skeleton-structure may comprise at least one curved-shaped rib 20. In the embodiment shown in FIGS. 7 and 8 there are four curved-shaped ribs. The shape provides flexibility to the structure and thus provides isolation/dampening for the sliding part 5.

In an embodiment, such as shown in FIGS. 7 and 8, there are gaps 27 between the ends of the ribs 20 and the back wall 15. With no load or small loads, the gaps 27 will remain open and thus provide isolation for the sliding part 5. With higher loads the gaps 27 will get closed due to elastic deformation of the ribs, and therefore the load is transferred into the back wall 15.

In an embodiment, there are no projection-like contact points 4 arranged to the ribs 20, but the ribs as such create the contact point 4 providing for at least one of the supporting surface 3 and the sliding part 5 capability to bend for absorbing guide rail imperfections. Where the bending for absorbing and dampening vibrations and noise is taking place depends at least mainly on dimensions and material characteristics of the ribs and the sliding part.

Figure 9:
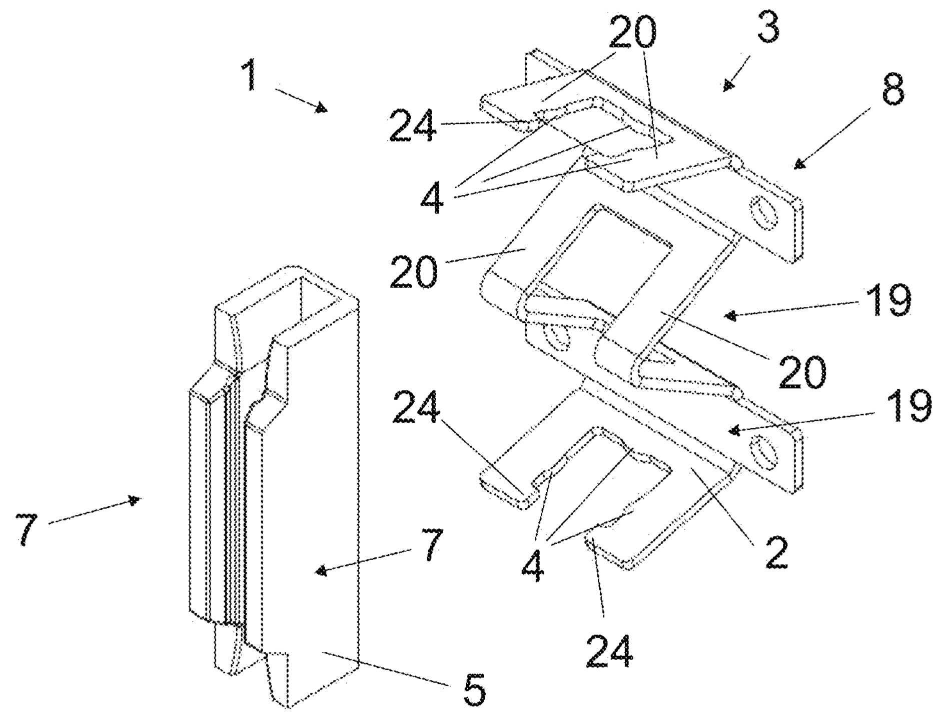
FIG. 9 is a schematic view of a fifth sliding guide shoe.
Figure 10:
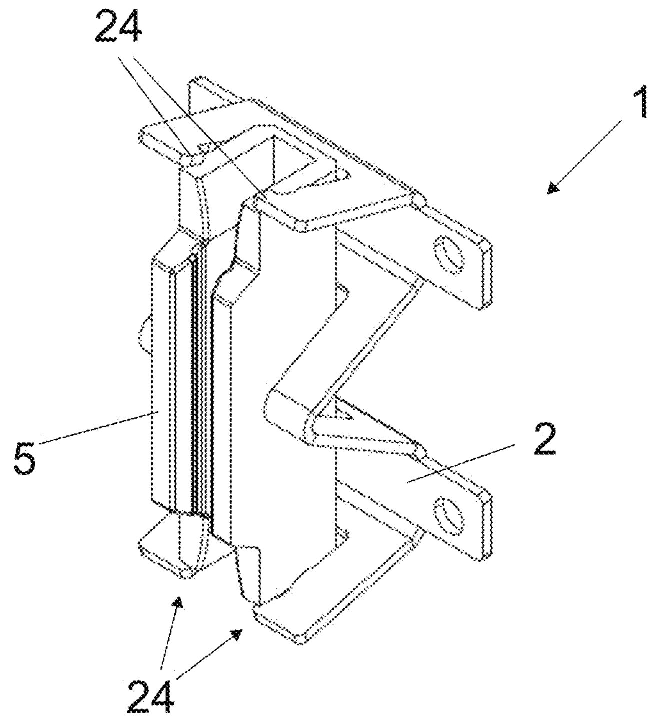
FIG. 10 is another schematic view of the sliding guide shoe shown in FIG. 9.

FIG. 9 is a schematic view of a fifth sliding guide shoe, and FIG. 10 is another schematic view of the sliding guide shoe shown in FIG. 9. This embodiment has many features similar to the embodiment shown in FIGS. 3 and 4 as well as in FIGS. 7 and 8, but the skeleton-structure has a different shape. Now the skeleton-structure comprises a triangle-shaped section on both sides of the frame part 2.

In an embodiment, the frame part 2 comprises latch extensions 24 that are arranged to keep the sliding part 5 in place in relation to the frame part 2. In an embodiment, such as shown in FIGS. 9 and 10, the latch extensions 24 are arranged in the frame part 2 and positioned so that they set against the bottom and the top end of the sliding part 5. The frame part 2 supports the sliding part 5 in X, Y and Z axis, and the sliding part may be assembled simply by pressing it into the frame part.

Figure 11:
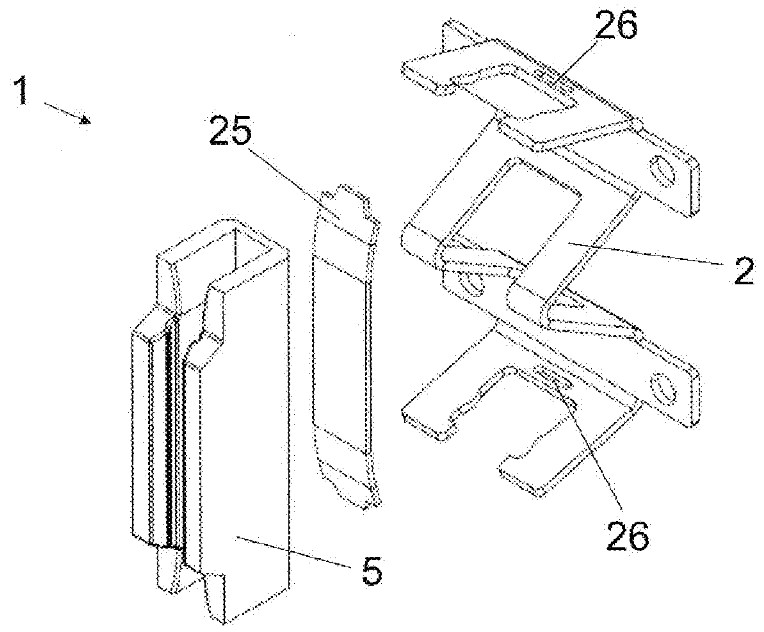
FIG. 11 is a schematic view of a sixth sliding guide shoe.
Figure 12:
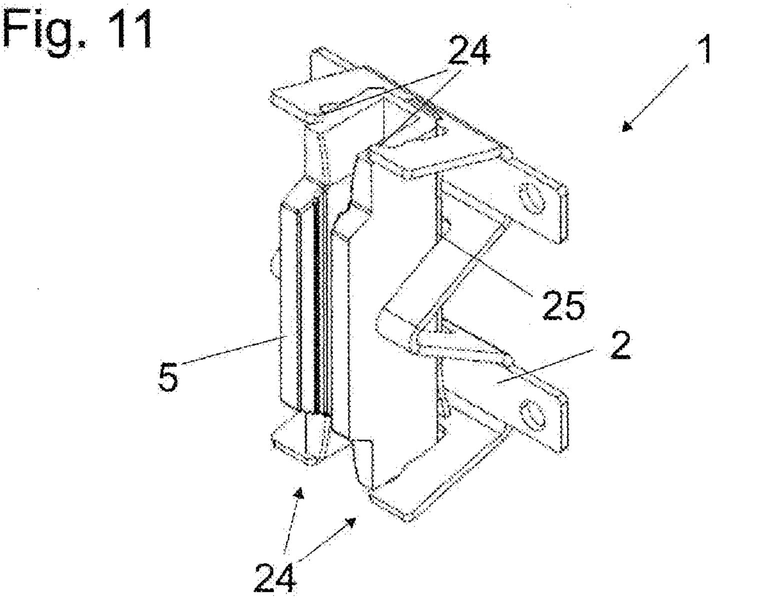
FIG. 12 is another schematic view of the sliding guide shoe shown in FIG. 11.

FIG. 11 is a schematic view of a sixth sliding guide shoe, and FIG. 12 is another schematic view of the sliding guide shoe shown in FIG. 11. In an embodiment, the sliding guide shoe 1 comprises a spring element 25 that is positioned between the frame part 2 and the back wall of the sliding part 5. In an embodiment, such as shown in FIG. 11, the spring element 25 comprises one leaf spring that may be manufactured from e.g. metal, plastic or composite material. The frame part 2 may comprise e.g. attachment holes 26 in which the spring element 25 is attached to. In other embodiments, the spring element may comprise plurality of springs. Also the type of the spring may vary, being e.g. coil spring. With no load or small loads, the spring element 25 will remain apart from the frame part 2 and thus provide isolation for the sliding part 5. With higher loads the spring element 25 will get contact with the frame part due to elastic deformation, and therefore the load is transferred into the frame part.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS

1 sliding guide shoe
2 frame part
3 supporting surface
4 contact point
5 sliding part
6 inner surface
7 outer surface
8 fixing arrangement
9 mounting base
10 moving component
11 elevator shaft
12 elevator car guide rail
13 tab
14 side wall
15 back wall
16 lug
17 fixing hole
18 bulge
19 empty space
20 rib
21 elevator car
22 counterweight
23 counterweight guide rail
24 latch extension
25 spring element
26 attachment hole
27 gap
100 elevator

The invention claimed is:

1. A sliding guide shoe for guiding a moving component in an elevator shaft vertically along a guide rail, the sliding guide shoe comprising:
- a frame part comprising a supporting surface, and a sliding part supported by the supporting surface,
- the sliding part comprising
  - an inner surface configured as a sliding surface against the guide rail, and
  - an outer surface arranged against the supporting surface,
- wherein
- the supporting surface and the sliding part contact each other through contact points at which the supporting surface of the frame part is in contact with the outer surface of the sliding part,
- said contact points comprise a fraction of a corresponding surface of said outer surface of the sliding part,
- the contact points are configured to provide at least one of the supporting surface and the sliding part a capability to bend for absorbing guide rail imperfections, and
- at least one of the contact points comprises a tab on the frame part, the tab is configured as partly cut away from the frame part and configured to elastically bend under loads caused by the guide rail imperfections.

2. The sliding guide shoe as claimed in claim 1, comprising a fixing arrangement configured to fix the sliding guide shoe to a mounting base.

3. The sliding guide shoe as claimed in claim 1, wherein the sliding part is configured to rest directly against the guide rail.

4. The sliding guide shoe as claimed in claim 1, wherein the inner surface of the sliding part is made of polymer or polymer composite material comprising injection molded polyethylene (PE), high-density-polyethylene (HDPE) or ultra-high molecular weight polyethylene (UHMWPE).

5. The sliding guide shoe as claimed in claim 1, wherein
- at least one of the contact points is arranged at side walls of the supporting surface, or at a back wall of the supporting surface, and
- at least another one of the side walls and the back wall comprises two or more of the contact points.

6. The sliding guide shoe as claimed in claim 1, wherein the tab comprises a same material as the supporting surface and is integrated with the supporting surface.

7. The sliding guide shoe as claimed in claim 1, wherein at least one of the contact points comprises a bulge of the supporting surface extending towards the outer surface.

8. The sliding guide shoe as claimed in claim 1, wherein the frame part is configured to provide a trough-shaped space for receiving the sliding part therein.

9. The sliding guide shoe as claimed in claim 1, wherein the moving component is an elevator car or a counterweight.

10. An elevator, comprising the sliding guide shoe as claimed in claim 1.

11. The elevator as claimed in claim 10, configured as a finished building or a construction time use (CTU) elevator.

12. The sliding guide shoe as claimed in claim 1, wherein the tab is configured to bend toward the sliding part.

13. The sliding guide shoe as claimed in claim 12, wherein the tab and the frame part comprise a metal.

14. A sliding guide shoe for guiding a moving component in an elevator shaft vertically along a guide rail, the sliding guide shoe comprising:

a frame part comprising a supporting surface, and a sliding part supported by the supporting surface, the sliding part comprising an inner surface configured as a sliding surface against the guide rail, and an outer surface arranged against the supporting surface, wherein the supporting surface and the sliding part contact each other through contact points at which the supporting surface of the frame part is in contact with the outer surface of the sliding part, the contact points comprise a fraction of a corresponding surface of said outer surface of the sliding part, the contact points are configured to provide at least one of the supporting surface and the sliding part a capability to bend for absorbing guide rail imperfections, the frame part is configured as a skeleton-structure including empty spaces that alternate with ribs, and the supporting surface is arranged in said ribs comprises contiguous U-shaped surfaces of the ribs that surround the sliding part.

15. The sliding guide shoe as claimed claim 14, wherein at least one of the contact points is arranged at the frame part.

16. The sliding guide shoe as claimed in claim 14, wherein at least one of the contact points comprises a projection that extends from a rib from among the ribs.

17. A sliding guide shoe for guiding a moving component in an elevator shaft vertically along a guide rail, the sliding guide shoe comprising:

a frame part comprising a supporting surface, and a sliding part supported by the supporting surface, the sliding part comprising an inner surface configured as a sliding surface against the guide rail, and an outer surface arranged against the supporting surface, wherein the supporting surface and the sliding part contact each other through contact points at which the supporting surface of the frame part is in contact with the outer surface of the sliding part, said contact points comprise a fraction of a corresponding surface of said outer surface of the sliding part, the contact points are configured to provide at least one of the supporting surface and the sliding part a capability to bend for absorbing guide rail imperfections, the sliding guide shoe further comprising a spring element between the frame part and a back wall of the sliding part, the spring element including a first end and a second end opposite the first end, the first end and the second end configured to be insertable into respective attachment holes of the frame part.

* * * * *